US008205797B2

(12) United States Patent
Tredoux et al.

(10) Patent No.: US 8,205,797 B2
(45) Date of Patent: Jun. 26, 2012

(54) METHOD AND SYSTEM FOR TRANSMITTING PROOF OF PAYMENT FOR "PAY-AS-YOU-GO" MULTI-FUNCTION DEVICES

(75) Inventors: Gavan Leonard Tredoux, Penfield, NY (US); Shanmuga-nathan Gnanasambandam, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 630 days.

(21) Appl. No.: 12/364,224

(22) Filed: Feb. 2, 2009

(65) Prior Publication Data
US 2010/0196075 A1    Aug. 5, 2010

(51) Int. Cl.
G06K 15/00    (2006.01)
(52) U.S. Cl. .......... 235/383; 235/375; 235/380; 400/62
(58) Field of Classification Search .............. 235/375, 235/378–380, 383, 385; 400/62
See application file for complete search history.

(56) References Cited

U.S. PATENT DOCUMENTS

| | | | |
|---|---|---|---|
| 5,146,344 A | 9/1992 | Bennett et al. |
| 5,563,999 A | 10/1996 | Yaksich et al. |
| 6,076,076 A | 6/2000 | Gottfreid |
| 6,202,155 B1 | 3/2001 | Tushie et al. |
| 6,357,942 B1 | 3/2002 | Adkins et al. |
| 6,373,587 B1 | 4/2002 | Sansone |
| 6,379,444 B1 | 4/2002 | Adkins et al. |
| 6,452,512 B1 | 9/2002 | Adkins et al. |
| 6,471,319 B1 | 10/2002 | Adkins et al. |
| 6,523,924 B1 | 2/2003 | Adkins et al. |
| 6,525,837 B1 | 2/2003 | Adkins et al. |
| 6,567,015 B2 | 5/2003 | Adkins et al. |
| 6,600,150 B1 | 7/2003 | Adkins et al. |
| 6,600,151 B2 | 7/2003 | Chapman et al. |
| 6,609,781 B2 | 8/2003 | Adkins et al. |
| 6,616,261 B2 | 9/2003 | Adkins et al. |
| 6,624,407 B1 | 9/2003 | Adkins et al. |

(Continued)

FOREIGN PATENT DOCUMENTS
JP    2002215374    8/2002
(Continued)

OTHER PUBLICATIONS

"Pay per Click." *Wikipedia, the Free Encyclopedia*. Oct. 3, 2008. Web. Jan. 11, 2011. <http://en.wikipedia.org/wiki/Pay_per_click>.

(Continued)

*Primary Examiner* — Michael G Lee
*Assistant Examiner* — Matthew Mikels
(74) *Attorney, Agent, or Firm* — Fay Sharpe LLP

(57) ABSTRACT

A method and system is provided including a plurality of multi-function devices being operatively associated with at least one controller. Each of the plurality of multi-function devices having time staggered payment support capabilities for enabling at least one user continued access to the plurality of multi-function devices. A detecting module is provided for enabling the plurality of multi-function devices to automatically detect, inspect, and verify at least one authorization code located on incoming print jobs. The method and system enable the at least one user to pay for continued access to the plurality of multi-function devices via time staggered installments without one or more of the plurality of MFDs directly accessing a payment center via a network connection and without manually supplying the at least one authorization code to the plurality of multi-function devices.

29 Claims, 1 Drawing Sheet

U.S. PATENT DOCUMENTS

| | | | |
|---|---|---|---|
| 6,626,513 | B2 | 9/2003 | Adkins et al. |
| 6,631,971 | B2 | 10/2003 | Adkins et al. |
| 6,637,961 | B1 | 10/2003 | Adkins et al. |
| 6,655,777 | B2 | 12/2003 | Adkins et al. |
| 6,660,996 | B1 | 12/2003 | Adkins et al. |
| 6,758,348 | B2 | 7/2004 | Adkins et al. |
| 6,763,336 | B1 | 7/2004 | Kolls |
| 6,768,427 | B1 | 7/2004 | Adkins et al. |
| 6,768,558 | B1 | 7/2004 | Yamashita et al. |
| 6,823,133 | B1 | 11/2004 | Adkins et al. |
| 6,830,399 | B2 | 12/2004 | Adkins et al. |
| 6,843,547 | B2 | 1/2005 | Adkins et al. |
| 6,865,241 | B1 | 3/2005 | Adkins et al. |
| 6,871,926 | B2 | 3/2005 | Adkins et al. |
| 6,873,424 | B2 | 3/2005 | Jakobsson et al. |
| 6,917,440 | B2 | 7/2005 | Kondo |
| 6,940,613 | B1 | 9/2005 | Beard et al. |
| 6,940,913 | B2 | 9/2005 | Verbin et al. |
| 6,957,921 | B1 | 10/2005 | Silverbrook et al. |
| 6,963,820 | B2 | 11/2005 | Adkins et al. |
| 6,976,798 | B2 | 12/2005 | Keane et al. |
| 7,050,726 | B2 | 5/2006 | Adkins et al. |
| 7,134,594 | B2 | 11/2006 | Thompson et al. |
| 7,146,114 | B2 | 12/2006 | Frankel et al. |
| 7,163,273 | B2 | 1/2007 | Silverbrook |
| 7,216,951 | B2 | 5/2007 | Garrana et al. |
| 7,240,995 | B2 | 7/2007 | Adkins et al. |
| 7,280,772 | B2 | 10/2007 | Adkins et al. |
| 7,369,782 | B2 | 5/2008 | Adkins et al. |
| 7,376,627 | B2 | 5/2008 | Adkins et al. |
| 7,430,605 | B2 | 9/2008 | Quach et al. |
| 7,469,107 | B2 | 12/2008 | Adkins et al. |
| 7,585,043 | B2 | 9/2009 | Adkins et al. |
| 7,589,850 | B2 | 9/2009 | Adkins et al. |
| 7,689,513 | B2 | 3/2010 | Adkins et al. |
| 7,739,198 | B2 | 6/2010 | Adkins et al. |
| 7,788,490 | B2 | 8/2010 | Adkins et al. |
| 7,792,992 | B2 | 9/2010 | Gnanasambandam et al. |
| 7,798,594 | B2 | 9/2010 | Adkins et al. |
| 7,859,412 | B2 | 12/2010 | Kothari et al. |
| 2002/0039193 | A1 | 4/2002 | Kondo et al. |
| 2002/0049638 | A1 | 4/2002 | Ito |
| 2002/0073002 | A1 | 6/2002 | Horii et al. |
| 2002/0135624 | A1 | 9/2002 | Naka et al. |
| 2002/0194064 | A1 | 12/2002 | Parry et al. |
| 2003/0090705 | A1 | 5/2003 | Ferlitsch |
| 2003/0098993 | A1 | 5/2003 | Ohara |
| 2003/0115156 | A1 | 6/2003 | Baker |
| 2003/0137549 | A1 | 7/2003 | Adkins et al. |
| 2003/0151762 | A1* | 8/2003 | Cherry et al. ............ 358/1.14 |
| 2004/0008371 | A1 | 1/2004 | Keane et al. |
| 2004/0012644 | A1 | 1/2004 | Allen et al. |
| 2004/0125397 | A1 | 7/2004 | Adkins et al. |
| 2004/0153415 | A1 | 8/2004 | Adkins et al. |
| 2004/0179885 | A1 | 9/2004 | Adkins et al. |
| 2004/0190014 | A1 | 9/2004 | Ferlitsh |
| 2004/0207668 | A1 | 10/2004 | Adkins et al. |
| 2004/0215577 | A1 | 10/2004 | Mitsuda |
| 2004/0236705 | A1 | 11/2004 | Shima et al. |
| 2004/0249733 | A1 | 12/2004 | Clough et al. |
| 2005/0091343 | A1 | 4/2005 | Murray, Jr. |
| 2005/0206672 | A1 | 9/2005 | Adkins et al. |
| 2005/0273403 | A1 | 12/2005 | Nguyen et al. |
| 2005/0286913 | A1 | 12/2005 | Adkins et al. |
| 2006/0004672 | A1 | 1/2006 | Leute |
| 2006/0020561 | A1 | 1/2006 | Kodimer et al. |
| 2006/0044590 | A1 | 3/2006 | Ferlitsch et al. |
| 2006/0056856 | A1 | 3/2006 | Adkins et al. |
| 2006/0065715 | A1* | 3/2006 | Kojima et al. ............ 235/380 |
| 2006/0069647 | A1 | 3/2006 | Cozian et al. |
| 2006/0095280 | A1 | 5/2006 | Gooding |
| 2006/0120735 | A1 | 6/2006 | Adkins et al. |
| 2006/0140647 | A1 | 6/2006 | Adkins et al. |
| 2006/0190324 | A1 | 8/2006 | Adkins et al. |
| 2006/0200735 | A1 | 9/2006 | Ormond |
| 2006/0224889 | A1 | 10/2006 | Adkins et al. |
| 2006/0233562 | A1 | 10/2006 | Zwiefelhofer |
| 2006/0259983 | A1 | 11/2006 | Sperry |
| 2006/0290973 | A1 | 12/2006 | Inouye et al. |
| 2007/0027990 | A1 | 2/2007 | Nakaoka et al. |
| 2007/0035762 | A1 | 2/2007 | Wilsher et al. |
| 2007/0035763 | A1 | 2/2007 | Bard et al. |
| 2007/0057982 | A1 | 3/2007 | Adkins et al. |
| 2007/0061268 | A1 | 3/2007 | Herold et al. |
| 2007/0075137 | A1 | 4/2007 | Adkins et al. |
| 2007/0077074 | A1 | 4/2007 | Adkins et al. |
| 2007/0079125 | A1 | 4/2007 | Adkins et al. |
| 2007/0088613 | A1 | 4/2007 | Adkins et al. |
| 2007/0094148 | A1 | 4/2007 | Adkins et al. |
| 2007/0156523 | A1* | 7/2007 | Liu et al. .................... 705/14 |
| 2007/0174218 | A1 | 7/2007 | Kojima et al. |
| 2007/0182984 | A1 | 8/2007 | Ragnet |
| 2007/0188530 | A1 | 8/2007 | Garrana et al. |
| 2008/0010211 | A1 | 1/2008 | Ferraro |
| 2008/0027875 | A1 | 1/2008 | Adkins et al. |
| 2008/0065477 | A1 | 3/2008 | Korhonen |
| 2008/0071626 | A1 | 3/2008 | Hill |
| 2008/0079989 | A1 | 4/2008 | Agnetta et al. |
| 2008/0181622 | A1 | 7/2008 | Adkins et al. |
| 2008/0183630 | A1 | 7/2008 | Stephenson |
| 2008/0186187 | A1 | 8/2008 | Adkins et al. |
| 2008/0186367 | A1 | 8/2008 | Adkins et al. |
| 2008/0319845 | A1 | 12/2008 | Adkins et al. |
| 2009/0006247 | A1 | 1/2009 | Hansen et al. |
| 2009/0066985 | A1 | 3/2009 | Ferlitsch |
| 2009/0070243 | A1 | 3/2009 | Buck et al. |
| 2009/0070276 | A1 | 3/2009 | Kodimer et al. |
| 2009/0147299 | A1 | 6/2009 | Tetu |
| 2009/0192910 | A9 | 7/2009 | Rankin et al. |
| 2009/0248578 | A1 | 10/2009 | Pollock et al. |
| 2010/0039669 | A1 | 2/2010 | Chang et al. |
| 2010/0088178 | A1 | 4/2010 | Gnanasambandam et al. |
| 2010/0088201 | A1 | 4/2010 | Nagarajan et al. |
| 2010/0097626 | A1 | 4/2010 | Moore et al. |
| 2010/0264214 | A1 | 10/2010 | Gnanasambandam et al. |
| 2010/0268591 | A1 | 10/2010 | Gnanasambandam et al. |
| 2011/0011929 | A1 | 1/2011 | Padua et al. |

FOREIGN PATENT DOCUMENTS

| | | | |
|---|---|---|---|
| WO | 0102946 | A1 | 1/2001 |

OTHER PUBLICATIONS

"Pay per Click." *Wikipedia, the Free Encyclopedia*. Jan. 31, 2009. Web. Jan. 11, 2011. <http://en.wikipedia.org/wiki/Pay_per_click>.

U.S. Appl. No. 12/364,224, filed Aug. 5, 2010, Tredoux et al.

U.S. Appl. No. 12/424,820, filed Oct. 21, 2010, Gnanasambandam et al.

U.S. Appl. No. 12/424,858, filed Oct. 21, 2010, Gnanasambandam et al.

GB Search Report, May 24, 2011.

"Pay per Click", Wikipedia, the Free Encyclopedia, Oct. 3, 2008, Web, Jan. 11, 2011, http://en.wikipedia.org/wiki/Pay_per_click.

"Pay per Click", Wikipedia, the Free Encyclopedia, Apr. 7, 2009, web, Jan. 11, 2011, http://en.wikipedia.org/wiki/Pay_per_click.

"Pay per Click", Wikipedia, the Free Encyclopedia, Jan. 31, 2009, web, Jan. 11, 2011, http://en.wikipedia.org/wiki/Pay_per_click.

* cited by examiner

METHOD AND SYSTEM FOR TRANSMITTING PROOF OF PAYMENT FOR "PAY-AS-YOU-GO" MULTI-FUNCTION DEVICES

BACKGROUND

1. Field of the Related Art

The present disclosure relates to document processing services, such as printing systems, and more particularly, to a method and system for enabling document processing services (including printing) on a plurality of "pay-as-you-go" compatible multi-function devices (MFDs) for automatically transmitting a proof of payment of additional consumables.

2. Background of the Related Art

The concept of "network printing," in which any of a plurality of computers submit digital data to one of any number of printers over a network, is well known. A conventional printing system uses a client/server architecture that usually includes three primary components. These components include (i) a client, (ii) a server, and (iii) an output device. The client conveys print and management requests to the server and receives responses from the server that arise in response to the submitted requests. The server receives these requests from the client, performs the required actions for each request, and returns the responses to the client. One such request from a client is a print request, i.e., a request to print one or more copies of one or more documents, with the printed pages output using one or more features. A print request may represent a collection of one or more documents to be printed, as well as instructions for printing. The server organizes the documents indicated in the print request submitted by the client into a print job. The server then sends the print job and any associated job control commands to an output device.

The output device is a physical device, or hardware, that is capable of rendering images of documents and producing hard copy output of the print jobs received from the server. The output device can then return responses to the server regarding its current state or the status of the received print jobs. The output device is commonly a printer. However, the output device may also be any type of multi-function device (MFD).

In general, a MFD operates as a plurality of different imaging devices, including, but not limited to, a printer, copier, fax machine, and/or scanner. In recent years the basic office copier has evolved into what can be referred to as a MFD. With digital technology, a machine with the basic outward appearance of a traditional copier can perform at least the additional functions of printing documents submitted in digital form over a network, sending and receiving messages via facsimile, recording hard-copy original images in digital form and sending the resulting data over a network, such as in electronic mail and/or recording hard-copy original images in digital form on a compact disc or equivalent medium.

In the area of digital printing and copying, there has been a growth in demand for MFDs. Such MFD devices may assume the form of an arrangement in which a single print engine (e.g., xerographic or thermal ink jet print engine) is coupled with a plurality of different image input devices (or "services"), with such devices being adapted to produce image related information for use by the printer or transmitted over a network. The image related information, in one example, could have its origin in video facsimile signals, microfilm, data processing information, light scanning platens for full size documents, aperture cards, and microfiche. MFDs provide a broader range of functionality than traditional single-function devices, such as dedicated printers, copiers, and scanners. As a result, because of their network transmission capabilities combined with their functionality, it would be useful to provide a means for transmitting a proof of payment for "pay-as-you-go" MFDs in an efficient manner.

For example, printers and other devices which consume materials such as toner and ink can be sold on a "pay-as-you-go" basis, where the device contains extra supplies which are paid for periodically when they are used. These devices cannot be used until the consumables are paid for, thus saving shipping costs when resupplying the device. However, the device refuses to use the supplies until they are paid for and requires some mechanism whereby it is informed that supplies have been purchased. Conventional mechanisms either involve accessing a user interface (UI) of the device and supplying a code obtained on purchase of supplies, or involves a means for communication between the device and a billing/payment center over a network connection, phone line or the like. The same issues arise with pre-paid metered devices where the right to use the device is paid for.

Thus, in conventional systems, there is no method for automatically informing one or more MFDs that the user or users of the MFDs have paid for additional consumables, such as ink and/or toner. Currently known methods for performing this process include several drawbacks. For example, if this takes the form of obtaining an authorization code on payment, and then entering the code into the machine though its user UI, either locally on the device or remotely through its web-based UI, the user is required to cut-and-paste the authorization code, or re-enter it manually, both of which are inconvenient. To take another example, if payment is transmitted to the machine over a network connection, say from a central site available on the internet, the device requires non-trivial configuration and deals with the issues of intervening firewalls and customer concerns about network privacy. As a result, this is an inefficient and time-consuming process since the user or users of the MFDs are required to complete several additional tasks in order to inform the one or more MFDs of additional consumables.

Consequently, current printing systems lack the capability to effectively and immediately inform one or more MFDs that usage rights have been repurchased. The present disclosure is intended to overcome the drawbacks of other methods by quickly and automatically transmitting a proof of payment for "pay-as-you-go" MFDs.

SUMMARY

The present disclosure provides a system including a plurality of multi-function devices. The plurality of multi-function devices being operatively associated with at least one controller and each of the plurality of multi-function devices having time staggered payment support capabilities for enabling at least one user continued access to the plurality of multi-function devices. The system includes a detecting module for enabling the plurality of multi-function devices to automatically detect, inspect, and verify at least one authorization code located on incoming print jobs and for enabling the at least one user to selectively access at least one controller of the plurality of multi-function devices once the at least one authorization code located on the incoming print jobs has been automatically detected, inspected, and verified by the detecting module. The system enables the at least one user to pay for continued access to the plurality of multi-function devices via time staggered installments without one or more of the plurality of MFDs directly accessing a payment center via a network connection and without manually supplying the at least one authorization code to the plurality of multi-function devices.

The present disclosure also provides a method for enabling printing capabilities. The method includes enabling a plurality of multi-function devices to be operatively associated with at least one controller. Each of the plurality of multi-function devices having time staggered payment support capabilities for enabling at least one user continued access to the plurality of multi-function devices. The method includes enabling the plurality of multi-function devices to automatically detect, inspect, and verify at least one authorization code located on incoming print jobs via a detecting module; and enabling the at least one user to selectively access at least one controller of the plurality of multi-function devices once the at least one authorization code located on the incoming print jobs has been automatically detected, inspected, and verified by the detecting module. The method enables the at least one user to pay for continued access to the plurality of multi-function devices via time staggered installments without one or more of the plurality of MFDs directly accessing a payment center via a network connection and without manually supplying the at least one authorization code to the plurality of multi-function devices.

The present disclosure also provides a computer-readable medium which stores programmable instructions configured for being executed by at least one processor for performing the methods described herein according to the present disclosure. The computer-readable medium can include flash memory, CD-ROM, a hard drive, etc.

BRIEF DESCRIPTION OF THE DRAWINGS

Various embodiments of the present disclosure will be described herein below with reference to the figures wherein.

DETAILED DESCRIPTION

Figure 1:
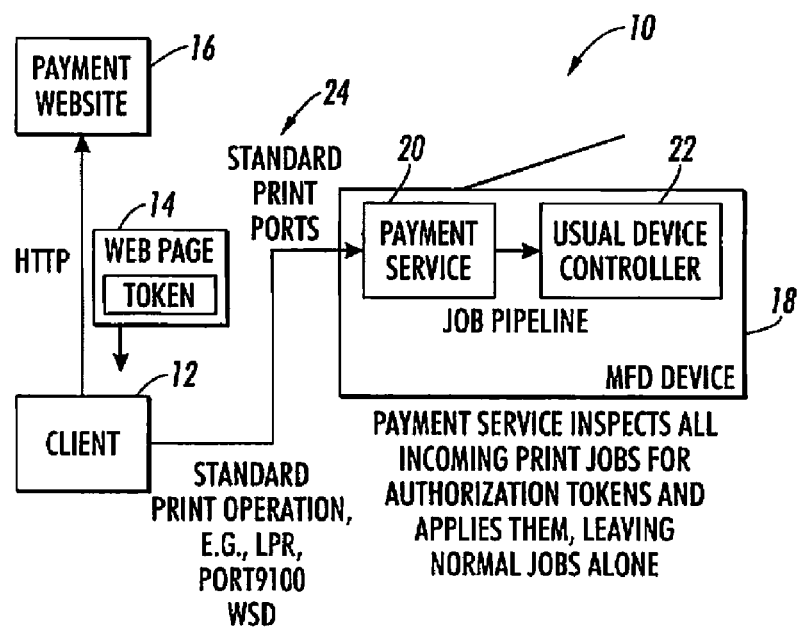
FIG. 1 is a schematic diagram of a "pay-as-you-go" system having a detecting module for inspecting incoming print jobs, in accordance with the present disclosure.

The present disclosure proposes a mechanism for informing a "pay-as-you-go" MFD or pre-paid metered device of supplies or usage rights that have been purchased. The user may use a website on the internet to pay, using well-established and familiar methods. When the payment is received, the resulting webpage displayed contains a secure authorization code, specifying the amount of supplies purchased. The user prints this page to the device, using well-known and familiar methods. The device then detects a payment code in the incoming print job and authorizes the required supplies. Depending on configuration, the device may or may not print the job and may or may not provide a hard-copy receipt of the payment. As a result, such a system obviates the need for a complex payment network between the device and the manufacturer or reseller, and is simpler and more convenient than cut-and-pasting, or reentering, the code between the payment webpage or any other electronic or printed document and the user interface of the device.

The present disclosure further proposes MFDs that may be sold on a pre-paid basis or a "pay-as-you-go" basis. For instance, the MFD may be sold containing more supplies than were paid for at time of purchase, and as these additional supplies are used, further payments may be required, thus amortizing the cost of supplies for the user over a longer time period and saving shipping costs for the manufacturer or re-supplier. Similarly, the MFD may be sold on a pre-paid metered basis, which means that the MFD may require periodic pre-payment for use of the MFD regardless of supplies. In each case, the MFD declines to perform the pre-paid functions when these have not been paid for, and requires some mechanism by which it is notified reliably and securely that usage rights have been paid for.

The term "print" is overloaded to mean sending the document to the printer through any one of a multitude of ways. Moreover, the term "printer" can refer to any device that accepts text and graphic output from any type of computing device and transfers the information to any printable medium. A "printer" can refer to any type of xerographic, solid ink, liquid ink, cut sheet or web-based device used to print onto a wide array of printable media. The term "printer" as used herein encompasses any apparatus, such as a digital copier, bookmaking machine, facsimile machine, multi-function machine, etc. which performs a print outputting function for any purpose.

MFDs disclosed herein include both those that are "connected" and those that are "unconnected," where connected and unconnected refer to physical connections. An "unconnected" MFD does not have access to a network (e.g., the Internet). A "connected" MFD is normally connected via an Ethernet card or the like to a network. In the present embodiments, the MFD may be an unconnected MFD that is in operative communication with a wireless device, the wireless device being able to access a network. A connection between the multi-function device and the wireless device is made through a two-way communication channel located on the multi-function device.

The term "MFD" can refer to any machine that connects to either a computing device and/or network and performs one or more of the following functions: print, scan, copy, and/or fax. Digital copiers, fax machines, printers, and scanner combinations are all examples of MFDs. The term "MFD" can further refer to any hardware that combines several functions in one unit. For instance, an MFD can be a standalone printer or any type of standalone machine/device/apparatus/component. For example, an MFD can be one or more personal computers (PCs), a standalone printer, a standalone scanner, a mobile phone, an MP3 player, audio electronics, video electronics, GPS systems, televisions, recording and/or reproducing media (such as CDs, DVDs, camcorders, cameras, etc.) or any other type of consumer or non-consumer analog and/or digital electronics. Such consumer and/or non-consumer electronics can apply in any type of entertainment, communications, home, and/or office capacity. Thus, the term "MFDs" can refer to any type of electronics suitable for use with a circuit board and intended to be used by a plurality of individuals for a variety of purposes.

The term "storage" can refer to data storage. "Data storage" can refer to any article or material (e.g., a hard disk) from which information is capable of being reproduced, with or without the aid of any other article or device. "Data storage" can refer to the holding of data in an electromagnetic form for access by a computer processor. Primary storage is data in random access memory (RAM) and other "built-in" devices. Secondary storage is data on hard disk, tapes, and other external devices. "Data storage" can also refer to the permanent holding place for digital data, until purposely erased. "Storage" implies a repository that retains its content without power. "Storage" mostly means magnetic disks, magnetic tapes and optical discs (CD, DVD, etc.). "Storage" may also refer to non-volatile memory chips such as flash, Read-Only memory (ROM) and/or Electrically Erasable Programmable Read-Only Memory (EEPROM).

The term "pay-as-you-go" may refer to a time-periodic payment or an "ad hoc" payment or an "as needed" payment, such as daily weekly, monthly, bi-monthly, quarterly, etc. payment(s). The fee could be a fixed fee or an adjustable fee based on the number of pages printed or based on user operations. Thus, the fee could be a changeable fee based on use or any other desirable parameter(s). The term "pay-as-you-go" may also refer to a system or practice of paying debts as they are incurred. The term "pay-as-you-go" may also refer to a type of service subscription which allows MFD owners/operators/controllers to pay in advance for print jobs or pay for print jobs printed on a time-periodic basis, and add more funds as needed, by day, week or month. Of course, the "pay-as-you-go" system is not limited to print jobs. It may apply to any user tasks/operations, such as, but not limited to, scanning, faxing, etc. The "pay-as-you-go" services may require no contract and no sign-up fees.

The term "authorization code" refers to a code that a user inputs to a system in order to gain access to resources such as applications, files, or networks and/or an identification number or password that is used to gain access to a local or remote computer system. The term "authorization" may also refer to the right or permission to use a system resource and/or the process of granting access to an MFD or system or network. The term "authorization code" may also refer to a payment token.

The term "module" refers to a self-contained component (unit or item) that is used in combination with other components and/or a separate and distinct unit of hardware or software that may be used as a component in a system, such as a printing system including a plurality of MFDs. The term "module" may also refer to a self-contained assembly of electronic components and circuitry, such as a stage in a computer that is installed as a unit.

Embodiments will be described below while referencing the accompanying figures. The accompanying figures are merely examples and are not intended to limit the scope of the present disclosure.

With reference to FIG. 1, there is presented a schematic diagram of a "pay-as-you-go" system having a detecting module for inspecting incoming print jobs, in accordance with the present disclosure.

The "pay-as-you-go" system 10 includes a client 12, a web page displaying an authorization token 14, a payment website 16 and an MFD 18. The MFD 18 may include a payment service 20 and a device controller 22 for processing incoming print jobs 24.

FIG. 1 illustrates how MFD 18 may be extended by adding the payment service 20 to inspect incoming print jobs 24 before they are processed in the traditional manner. In this case, the payment service 20 interposes itself between all network clients 12 and the standard services for accepting print jobs 24 by binding to the network ports on which print jobs 24 are accepted. The clients 20 are not aware of this and determine no difference in behavior of the MFD 18. In other words, the MFD 18 continues to function in its usual manner unaffected by processing performed by the payment service 20. The payment service 20 works in the background so as not to interfere with any of the MFD functions.

Moreover, the payment service 20 inspects each print job 24 it receives, searching for payment authentication tokens 24. The authorization tokens 24 should conform to a known pattern, which may be specific to the device manufacturer or may in the future be standardized by an industry consortium. However, the pattern used is assumed to be sufficiently complex, so that it would not occur randomly in a document (with any significant probability) and can only have been placed there deliberately. Consequently when the pattern is detected by the payment service 20, it may have high confidence that it is not mistaking normal user content for a payment authorization token 14.

Furthermore, it makes no difference what coding scheme is used for the authorization processing. In other words, it is assumed only that the MFD 18 is able to detect that the authorization code 14 was not forged and was issued by a trusted party, and that the authorization token code 14 contains within it information about the usage that was paid for. By way of example, there are several well-known methods and/or techniques for accomplishing this, such methods and/or techniques involving public key cryptography, in which the issuer of the authorization token 14 signs the authorization token 14 using a secret key which can be verified by anyone using the public key, and some chain of trust (say, by repeated cryptographic signing) assuring it that the public key in question is the one to use.

For example, since the MFDs do not have access to one or more databases, but instead utilize one or more authentication codes to allow their continued usage by at least one user, the authentication code is checked by any of a plurality of mechanisms. One such mechanism may include answering the following questions. For instance, (1) Is the authentication code valid, i.e., issued by the correct authority? and then (2) Does the authentication code apply to this MFD and for what amount? and then (3) Has the authentication code been used before on this MFD?

One way to accomplish this task is to use public key cryptography. The MFD only needs a list of trusted authorities. The authentication code is ultimately signed by such an authority, thus answering question 1. In addition the authentication code contains the amount (preferably in encrypted form) and a serial number (or equivalent identification means) of the MFD, thus answering question 2. The authentication code contains an expiration data and a unique identifier, which the MFD remembers for at least as long as the expiration period, thus answering question 3. Once again, this is only an exemplary methodology and there are many other schemes possible for accomplishing such a task.

Proceeding from the assumption above that the user obtains a receipt for payment in the form of an electronic document, such as a web page or email message or other printable electronic document, the system and method described in the present disclosure allow the user to simply print that document directly on the MFD by using the established method, which is already familiar to the user. In the case of a networked printing device, this is usually the operation of printing to a queue on a local or remote print server, or perhaps directly to the printer. In any case, the user already knows how to approach such a task and can perform the operation immediately by using a few commands or mouse-clicks.

However, the MFD 18 does not necessarily print a page as a result of the detection of the authorization token 14 by the payment service 20. Instead, the MFD 18 inspects incoming print jobs 24 for the authorization tokens 14 described above. Print jobs 24 which do not contain such authorization tokens 14 are treated as they normally would be. Print jobs 24 which do contain the authorization tokens 14 are interpreted as instructions to the pre-payment mechanism of the MFD 18 itself, and not merely as ordinary print jobs. Recognized authorization tokens 24 are then automatically applied as payments by the MFD 18 and the usage rights which have been purchased are allowed. In other words, once a valid authorization token 14 is detected by the payment service 20, the MFD 18 is automatically informed and/or notified that consumables (e.g., ink, toner, etc.) have been repurchased for the MFD 18 and that the MFD 18 is permitted to continue functioning in a normal manner.

Whether or not a printed page is then produced from the print job 24 is treated as a configuration decision. For example, the MFD 18 may be configured to take no further action when payments are recognized and the print jobs 24 are then discarded. Or, for example, the MFD 18 may be configured to print the print job 24, as a form of receipt for the payment and proof that it has been recognized and applied by the MFD 18 (some user may prefer to save the paper and supplies instead). Thus an MFD 18 may be configured to email an acknowledgement instead of printing the receipt page. The MFD 18 may inform/notify the user of the proof of payment in any method contemplated. For example, a message may be texted to the user's cell phone, personal digital assistant (PDA), personal computer (PC) or to any other electronic means of communication.

In an alternate embodiment, the payment service 20, which inspects incoming print jobs for payment tokens, may be realized in a separate piece of hardware and then be "snapped in" to the network connection of the device, e.g., its Ethernet port and the network connection then plugs into the snap-on device which acts as a bridge. This configuration of the alternate embodiment allows a user to apply the payment system to third-party hardware or older hardware which does not have the payment module built-in. The snap-in module, after detecting payment, would use other mechanisms the MFD already has for enabling functionality or supplies, e.g., making an HTTP (hyper text transfer protocol) or SNMP (simple network management protocol) request to the MFD with the extracted authorization code. Effectively, the snap-in module translates between the pay by printing mechanism and whatever other mechanism an existing or future MFD uses.

In other words, the payment service 20 may be a hardware component that is removable and/or attachable and/or interchangeable and/or insertable into a plurality of different systems (not limited to printing systems with MFDs). This allows for additional flexibility in "pay-as-you-go" systems. Also, the payment service 20 may be constructed so that it forms a discrete removable/interchangeable component for servicing or replacement.

Figure 2:
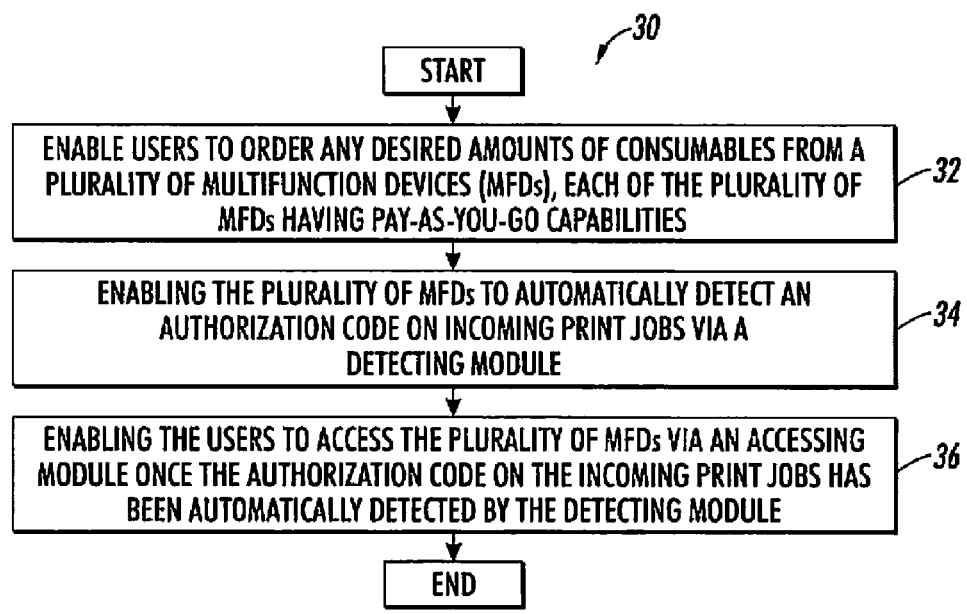
FIG. 2 is a flowchart illustrating a "pay-as-you-go" system having a detecting module for inspecting incoming print jobs, in accordance with the present disclosure.

With reference to FIG. 2, there is presented a flowchart illustrating a "pay-as-you-go" system having a detecting module for inspecting incoming print jobs, in accordance with the present disclosure.

The flowchart 30 includes the following steps. In step 32, users are enabled to order any desired amounts of consumables from a plurality of MFDs, each of the plurality of MFDs having "pay-as-you-go" capabilities. In step 34, the plurality of MFDs are enabled to automatically detect an authorization code on incoming print jobs via a detecting module. In step 36, the users are enabled to access the plurality of MFDs via an accessing module once the authorization code on the incoming print jobs has been automatically detected by the detecting module. The process then ends.

As illustrated in FIG. 1, the payment service 20, when it detects a payment authorization token 14, applies the payment to the appropriate MFD services and then inspects its configuration to decide what to do with the print job. As discussed above with reference to FIG. 1, the configuration may result in the print job 24 being printed as a hard-copy receipt or may instead result in some other notification, such as an email message to the configured device administrator. Mechanisms to prevent reuse of authorization tokens 24, may include "nonce" mechanisms, expiration dates and the like, and it is assumed that the payment service 20 utilizes some method for handling such preventive use.

The present disclosure proposes an alternative method that takes advantage of "pay-as-you-go" systems relating to printing jobs on MFDs in order to make the process of printing simple and as streamlined as possible to provide for an efficient user experience. The concept of using a "pay-as-you-go" system is a general concept in that it can be used for applications other than printers by any service provider. For example, service providers could use any type of printer and/or MFD and/or electronic device to achieve the desired results of the present disclosure. Also the printing system of the present disclosure makes it easier for information technology (IT) groups and/or service providers to manage/control/operate the printing environment for their clients.

A service provider can be any entity that develops, offers, controls, manages, owns, alters and/or sells software and/or hardware products. A service provider can be any entity that performs one or more tasks on one or more pre-existing MFDs, which may or may not be controlled or owned by the service provider. For example, the entity can offer a service with an existing software package and/or with any type of existing Internet-based service through the Internet. In other words, a service provider need not own or provide the MFDs. The MFDs may be owned or provided by any third party not related or associated with the service provider. In the present disclosure, it is contemplated that the entity (such as a service provider) can offer any type of service and/or product to optimize pre-existing, pre-owned MFDs by referring potential customers to an Internet website or a store that may or may not be associated with printing-related services and/or products. The term "entity" can refer to anything that may exist as a discrete and/or distinct unit that owns, operates, manages, and/or controls one or more of a plurality of machines (such as MFDs). For example, the term "entity" may include the term "company."

In summary, the present disclosure contains a straightforward way of notifying a device (such as an MFD) of payments for its own usage. The present disclosure addresses only this notification mechanism and not the business models or other mechanisms involved in pre-payment. The exemplary embodiments of the present disclosure assume that payment is made using a familiar mechanism resulting in an authorization code being issued, say, from a website which provides the usual online payment facilities. The precise way in which this is achieved is not critical to the present disclosure, except in so far as it is assumed to produce some sort of authorization code, which is available to the user as an electronic document, as in the a webpage containing a receipt from an online payment. However, for example, an MS Word document may just as well be emailed to the user and have the same effect of providing the electronic document with the token. In addition, the user may be informed of the consumables purchased or of the MFD knowing of the consumables purchased by any type of electronic means (such as by cell phone, by text messaging, by PDA, by PC, etc.)

Consequently, the present disclosure describes a system and method that provides a mechanism for informing a "pay-as-you-go" MFD or pre-paid metered device of supplies or usage rights that have been purchased. The user may use a website on the Internet to pay, using well-established and familiar methods. When the payment is received, the resulting webpage displayed contains a secure authorization code specifying the amount of supplies purchased. The user may print this page to the MFD. The MFD then detects a payment code in the incoming print job and authorizes the required supplies. Depending on configuration, the device may or may not print the job and may or may not provide a hard-copy receipt of payment. This obviates the need for a payment network between the MFD and the manufacturer or reseller or service provider, and is simpler and more convenient than cut-and-pasting, or reentering, the code between the payment webpage and the user interface of the MFD.

The present disclosure also includes as an additional embodiment a computer-readable medium which stores programmable instructions configured for being executed by at least one processor for performing the methods described herein according to the present disclosure. The computer-readable medium can include flash memory, CD-ROM, a hard drive, etc.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system comprising:
a plurality of multi-function devices, said plurality of multi-function devices being operatively associated with at least one controller and each of said plurality of multi-function devices having time staggered payment support capabilities for enabling at least one user continued access to said plurality of multi-function devices; and
a detecting module for enabling said plurality of multi-function devices to automatically detect, inspect, and verify at least one authorization code located on incoming print jobs and for enabling the at least one user to selectively access at least one controller of said plurality of multi-function devices once the at least one authorization code located on the incoming print jobs has been automatically detected, inspected, and verified by said detecting module;
wherein the at least one user is enabled to pay for continued access to said plurality of multi-function devices via time staggered installments without one or more of the plurality of MFDs directly accessing a payment center via a network connection and without manually supplying the at least one authorization code to said plurality of multi-function devices.

2. The system according to claim 1, wherein said detecting module verifies whether the at least one authorization code includes information relating to availability of prepaid funds and usage rights purchased.

3. The system according to claim 1,
wherein the print job is a first type job or a second type job; and
wherein when the payment center determines that the print job is the first type job, then it applies a payment, and when the payment center detects that the print job is the second type job, then it prints the second type job as a regular print job.

4. The system according to claim 1, wherein the authorization code is a token provided in a web page.

5. The system according to claim 1, wherein notification of the incoming print jobs containing the at least one authorization code is printed by the at least one user of said plurality of multi-function devices as a printed receipt.

6. The system according to claim 1, wherein notification of the incoming print jobs containing the at least one authorization code is provided to the at least one user as an electronic receipt.

7. The system according to claim 1, wherein an authorization mechanism determines a number of times that the at least one authorization code has been utilized by the at least one user.

8. The system according to claim 1, wherein the detecting module is a removable module that is inserted to a network connection of one or more of the plurality of multi-function devices.

9. A method for enabling printing capabilities, the method comprising:
enabling a plurality of multi-function devices to be operatively associated with at least one controller and each of said plurality of multi-function devices having time staggered payment support capabilities for enabling at least one user continued access to said plurality of multi-function devices;
enabling said plurality of multi-function devices to automatically detect, inspect, and verify at least one authorization code located on incoming print jobs via a detecting module; and
enabling the at least one user to selectively access at least one controller of said plurality of multi-function devices once the at least one authorization code located on the incoming print jobs has been automatically detected, inspected, and verified by said detecting module;
wherein the at least one user is enabled to pay for continued access to said plurality of multi-function devices via time staggered installments without one or more of the plurality of MFDs directly accessing a payment center via a network connection and without manually supplying the at least one authorization code to said plurality of multi-function devices.

10. The method according to claim 9, wherein said detecting module verifies whether the at least one authorization code includes information relating to availability of prepaid funds and usage rights purchased.

11. The method according to claim 9,
wherein the print job is a first type job or a second type job; and
wherein when the payment center determines that the print job is the first type job, then it applies a payment, and when the payment center detects that the print job is the second type job, then it prints the second type job as a regular print job.

12. The method according to claim 9, wherein the authorization code is a token provided in a web page.

13. The method according to claim 9, wherein notification of the incoming print jobs containing the at least one authorization code is printed by the at least one user of said plurality of multi-function devices as a printed receipt.

14. The method according to claim 9, wherein notification of the incoming print jobs containing the at least one authorization code is provided to the at least one user as an electronic receipt.

15. The method according to claim 9, wherein an authorization mechanism determines a number of times that the at least one authorization code has been utilized by the at least one user.

16. The method according to claim 9, wherein the detecting module is a removable module that is inserted to a network connection of one or more of the plurality of multi-function devices.

17. A computer-readable medium storing programmable instructions configured for being executed by at least one processor for performing a method for enabling printing capabilities, the method comprising the steps of:

enabling a plurality of multi-function devices to be operatively associated with at least one controller and each of said plurality of multi-function devices having time staggered payment support capabilities for enabling at least one user continued access to said plurality of multi-function devices;

enabling said plurality of multi-function devices to automatically detect, inspect, and verify at least one authorization code located on incoming print jobs via a detecting module; and enabling the at least one user to selectively access at least one controller of said plurality of multi-function devices once the at least one authorization code located on the incoming print jobs has been automatically detected, inspected, and verified by said detecting module;

wherein the at least one user is enabled to pay for continued access to said plurality of multi-function devices via time staggered installments without one or more of the plurality of MFDs directly accessing a payment center via a network connection and without manually supplying the at least one authorization code to said plurality of multi-function devices.

18. The computer-readable medium according to claim 17, wherein said detecting module verifies whether the at least one authorization code includes information relating to availability of prepaid funds and usage rights purchased.

19. The computer-readable medium according to claim 17, wherein the print job is a first type job or a second type job; and wherein when the payment center determines that the print job is the first type job, then it applies a payment, and when the payment center detects that the print job is the second type job, then it prints the second type job as a regular print job.

20. The computer-readable medium according to claim 17, wherein the authorization code is a token provided in a web page.

21. The computer-readable medium according to claim 17, wherein notification of the incoming print jobs containing the at least one authorization code is printed by the at least one user of said plurality of multi-function devices as a printed receipt.

22. The computer-readable medium according to claim 17, wherein notification of the incoming print jobs containing the at least one authorization code is provided to the at least one user as an electronic receipt.

23. The computer-readable medium according to claim 17, wherein an authorization mechanism determines a number of times that the at least one authorization code has been utilized by the at least one user.

24. The computer-readable medium according to claim 17, wherein the detecting module is a removable module that is inserted to a network connection of one or more of the plurality of multi-function devices.

25. A system for authorizing printing of a print job from a client communicating with a network, comprising:

a multi-functional document processing device communicating with the network, said multi-functional document processing device being operatively associated with a plurality of device related services and receiving the print job;

said multi-functional document processing device including a payment service for detecting whether an authorization code is embedded within the print job received at said multi-functional document processing device;

wherein, responsive to detecting the authorization code embedded within the print job received at said multi-functional document processing device, said payment service applies payment to one or more of the plurality of device related services; and wherein said payment service enables at least one user to pay for continued access to said multi-function device and for continued access to others of a plurality of multi-function devices via time staggered installments without one or more of the plurality of multi-function devices directly accessing a payment center via a network connection and without manually supplying the authorization code to said multi-function devices.

26. The system according to claim 25, wherein the print job is a first type job or a second type job; and wherein when the payment service determines that the print job is the first type job, then it applies a payment, and when the payment service detects that the print job is the second type job, then it prints the second type job as a regular print job.

27. The system according to claim 25, wherein the authorization code is a token provided in a web page.

28. The system according to claim 25, wherein notification of the print job containing the authorization code is printed by a user of said multi-functional document processing device as a printed receipt.

29. The system according to claim 25, wherein notification of the print job containing the authorization code is provided to a user as an electronic receipt.

* * * * *